United States Patent [19]
Bergman

[11] 3,854,063
[45] Dec. 10, 1974

[54] ELECTRIC MOTOR ADAPTED TO BE COUPLED DIRECTLY TO A SHAFT OF APPARATUS FOR PERFORMING WORK

[75] Inventor: Carl-Axel Leopold Bergman, Atvidaberg, Sweden

[73] Assignee: Aktiebolaget Overums Bruk, Overum, Sweden

[22] Filed: Jan. 9, 1974

[21] Appl. No.: 431,915

[30] Foreign Application Priority Data
Jan. 10, 1973 Sweden.................7300322

[52] U.S. Cl. ........................ 310/75 D, 64/13
[51] Int. Cl. ............................. H02k 7/14
[58] Field of Search ........ 310/67, 68, 75, 69, 75 D, 310/90, 91, 79, 89, 261, 216, 112, 114, 211; 64/11, 12, 13

[56] References Cited
UNITED STATES PATENTS

| | | | |
|---|---|---|---|
| 2,385,369 | 9/1945 | Niekamp | 310/75 D |
| 2,386,017 | 10/1945 | Venditty | 64/11 |
| 2,832,906 | 4/1958 | Koons | 64/13 X |
| 2,855,767 | 10/1958 | Ahlen | 64/13 |
| 2,956,187 | 10/1960 | Wood | 310/75 |
| 3,094,638 | 6/1963 | Humpal et al. | 310/75 D |

Primary Examiner—Donovan F. Duggan
Attorney, Agent, or Firm—Edmund A. Fenander

[57] ABSTRACT

An electric motor is adapted to be coupled directly to apparatus for performing work, such as a pump, for example, which has a casing and a shaft projecting therefrom. The rotor of the motor, which is adapted to be positioned adjacent to the shaft in axial alignment therewith, is journaled at its end removed from an end wall of the casing. A flexible disk is fixed to the opposite end of the rotor which is not journaled. Instead, a hollow hub which is carried by the disk at its axis of rotation and receives the shaft provides an arrangement for directly coupling the motor to the shaft.

4 Claims, 2 Drawing Figures

ELECTRIC MOTOR ADAPTED TO BE COUPLED DIRECTLY TO A SHAFT OF APPARATUS FOR PERFORMING WORK

BACKGROUND OF THE INVENTION

1. Field of the Invention

Electric motors are employed for driving all kinds of equipment, such as pumps, for example, which perform useful work. In many installations of this kind, it is essential for the motor and equipment associated therewith to occupy a minimum amount of space. In such installations considerable space often is required in an axial direction in order to accomodate the pairs of bearings employed for the electric motor and driven equipment, respectively, and the mechanism for coupling the shafts of these components.

2. Description of the Prior Art

It has been proposed heretofore to omit the bearing of an electric motor which is nearer to the equipment being driven and to employ the bearing of the equipment closely adjacent to the motor as a second bearing for the shaft of the motor. In an arrangement of this kind the electric motor and equipment are provided with surfaces which are accurately positioned in abutting relation with one another. Usually the bearing housing of the equipment comprises a journal disposed in a sleeve provided on the stator of the electric motor.

Certain problems are encountered when the shafts of the electric motor and equipment are coupled in the manner just described. The coupling mechanism, which is mounted either on the end of one shaft or partly on the ends of both shafts, must start functioning as soon as the shafts are moved together during assembly. This is so for the reason that there is no space for mechanism primarily suitable for mounting the components together.

The coupling mechanism desirably must be relatively short in an axial direction in order to minimize the part of the available space it occupies. With the tolerances that are economically feasible, as when an electric motor and pump for an oil heating plant are coupled together in dwellings, for example, it is very difficult to align the shafts of the motor and driven equipment sufficiently to avoid damaging one bearing. This bearing usually is the motor bearing removed from the coupling mechanism and occurs when the shafts are not properly aligned. This causes eccentric loading stress on the bearings and subjects them to rapid wear even when the angle of deviation of the shafts is 1° or less.

SUMMARY OF THE INVENTION

It is an object of my invention to overcome the aforementioned disadvantages and provide an arrangement for directly coupling an electric motor to the shaft of driven equipment for performing work which is of minimum length in a lengthwise direction and will permit a small misalingment of the shafts of the motor and apparatus or equipment coupled thereto.

In the apparatus for performing work, such as a pump, for example, which has a casing and a shaft projecting therefrom, I accomplish this by positioning the rotor of an electric motor adjacent to the shaft in axial alignment therewith. The rotor is journaled at its end removed from an end wall of the casing, and a flexible disk is fixed to the opposite end of the rotor which is not journaled. A hollow hub is carried by the disk at its axis of rotation and receives the shaft to provide a simple arrangement for directly coupling the motor to the shaft.

DESCRIPTION OF THE PREFERRED EMBODIMENT

Figure 1:
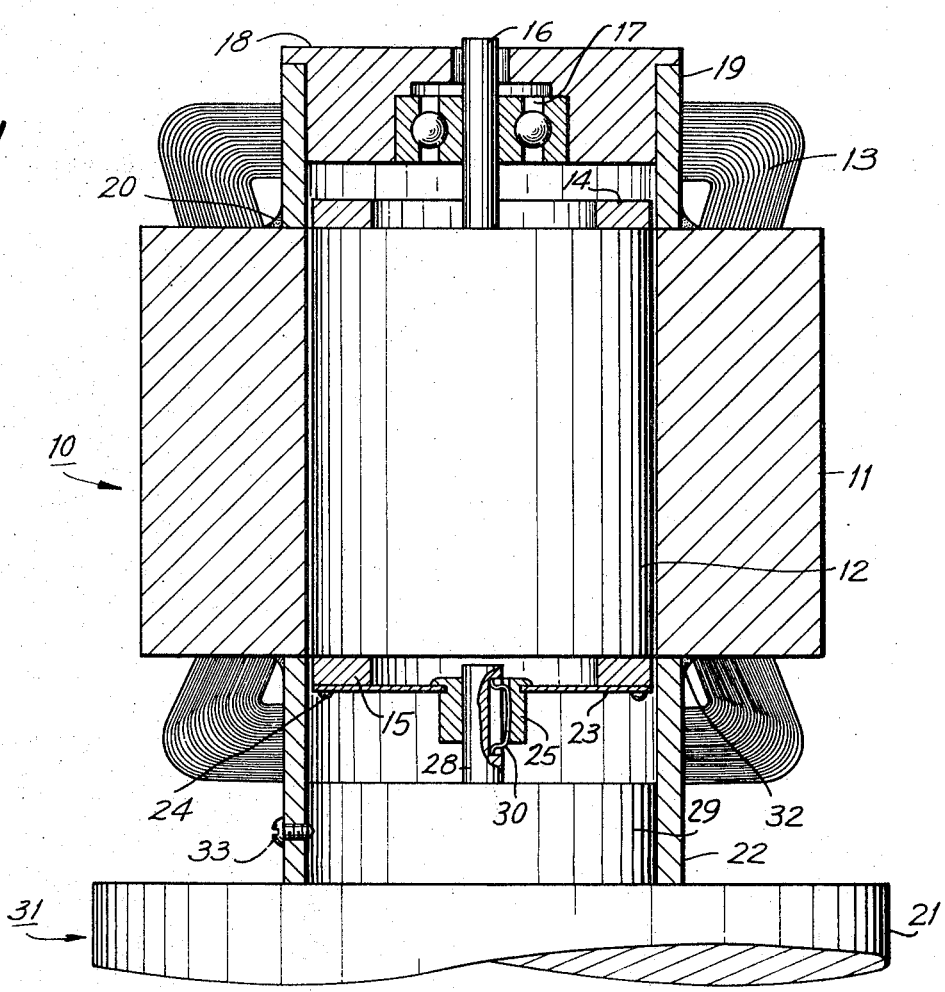
FIG. 1 is a sectional view of an electric motor and apparatus driven by the motor which are directly coupled to one another by mechanism embodying my invention.

Referring to the drawing, I have shown an electric motor 10 of a single phase or shaded pole type having a stator 11 and a rotor 12. The stator 11 is provided with conventional windings 13 and the rotor 12, which is of the squirrel-cage type, comprises rotor bars (not shown) which are short-circuited by short-circuiting rings 14 and 15 at opposite ends of the rotor.

The shaft 16 at one end of the rotor 12 is journaled in a bearing 17 mounted in a housing 18. The housing 18 is accurately fitted in a holder 19 of cylindrical form which is fixed at 20 in any suitable manner to the stator 11.

The rotor 12 is positioned closely adjacent to and in alignment with a shaft 28 which projects from a casing 21 of equipment or apparatus 31, such as a pump, for example, for performing useful work.

Th end of the rotor 12 nearer to the casing 21 of the apparatus 31 also is provided with a holder 22 of cylindrical form which is like the holder 19 and fixed at 32 to the stator 11. To protect the projecting end portions of the windings 13 and firmly anchor the holders 19 and 22 to the stator 11, these parts may be enveloped in thermoplastic material (not shown), as by molding, for example.

In accordance with my invention, the motor 10 is directly coupled to the apparatus 31 by coupling mechanism comprising a relatively thin circular disk 23 which is resilient in character and formed of stainless steel, for example. The disk 23 at its peripheral edge portion is fixed at 24, as by riveting, for example, to the short-circuiting ring 15. A hollow hub 25 is carried by the disk 23 at its axis of rotation and projects toward the end wall of the casing 21 of the apparatus 31. The hub 25 is fixed to the disk 23 at an opening therein in any suitable manner so that these parts cannot move angularly with respect to one another.

The hollow hub 25 at the opening therein has an axially extending slot or groove 26. The slot 26 coacts with a similar axially extending slot or groove 27 in the shaft 28. The wedge-shaped slots 26 and 27 are of the same cross-sectional area.

The casing 21 at its end wall is formed with a neck portion 29 which snugly fits in the holder 22 and is fixed thereto in any suitable manner, as by screws 33, for example.

A resilient bracket 30 of U-shape is employed to detachably connect the hub 25 and shaft 28, as shown in FIG. 1. It will be seen that the opposing legs of the U-shaped bracket 30 are of S-shape. When the resilient bracket 30 is removed from the slot or groove 27 it assumes a position which is longer than the groove 27.

Figure 2:
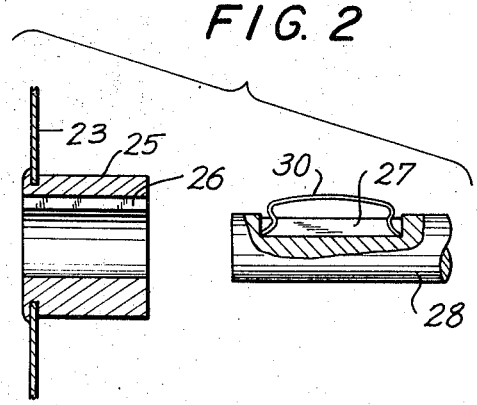
FIG. 2 is an enlarged exploded view of parts of the coupling mechanism shown in FIG. 1 to illustrate details more clearly.

Hence, when the bracket 30 is positioned in the groove 27, as seen in FIG. 2, the bracket is under tension and remains in such position.

With the neck portion 29 of the apparatus 31 out of the holder 22, the bracket 30 is positioned in the slot or groove 27 of the shaft 28. With the slots or grooves 27 and 28 in alignment the neck portion 29 is moved axially into the holder 22. When the hollow hub 25 and shaft 28 are in telescopic relation, the resilient bracket 30 assumes the position shown in FIG. 1.

Under these conditions the bracket 30 serves as key means between the rotor 12 and shaft 28. By reason of its shape the resilient bracket 30 exerts a radial force between the hub 25 and shaft 28 so that these parts will be connected without play. Any possible angle deviations between the rotor 12 and shaft 28 will be absorbed by the diaphragm coupling formed by the resilient disk 23 and the hollow hub 25.

The coupling arrangement shown and described above is simple and inexpensive and requires a minimum amount of space in an axial direction for the reason that no journaling means is required at the end of the rotor 12 which is nearer to the end wall of the casing 21 of the apparatus 31.

I calim:

1. For use with apparatus for performing work having a casing and a shaft projecting from an end wall thereof,
   a. an electric motor including a rotor adapted to be positioned adjacent to the shaft in axial alignment therewith,
   b. means for journaling the end of said rotor removed from the end wall of the casing, the opposite end of said rotor nearer to the end wall of said casing being characterized by the absence of journaling means,
   c. means for coupling said motor directly to the shaft,
   d. said coupling means comprising a flexible disk fixed to the end of said rotor nearer to the end wall of the casing, and
   e. a hollow hub which is carried by said disk at its axis of rotation and receives the shaft.

2. An electric motor as set forth in claim 1 in which said rotor comprises a winding short-circuited at its opposite ends by short-circuiting rings, said flexible disk at its peripheral edge portion being fixed to said ring nearer to the end wall of the casing.

3. An electric motor as set forth in claim 1 in which said hollow hub at the opening therein has an axially extending groove, and means for detachably locking said hub to the shaft comprising key means disposed in the axially extending groove.

4. For use with apparatus as set forth in claim 1 in which the shaft thereof is provided with resilient key means, said hollow hub at the opening therein having an axially extending groove to receive said resilient key means for detachably locking said hub to the shaft.

* * * * *